(12) United States Patent
Olsson

(10) Patent No.: US 8,521,635 B2
(45) Date of Patent: Aug. 27, 2013

(54) METHOD OF NEGOTIATING TRADES ON AN ELECTRONIC TRADING SYSTEM AND AN ELECTRONIC TRADING SYSTEM

(75) Inventor: Johan L Olsson, Lidingö (SE)

(73) Assignee: OMX Technology AB, Stockholm (SE)

( * ) Notice: Subject to any disclaimer, the term of this patent is extended or adjusted under 35 U.S.C. 154(b) by 625 days.

(21) Appl. No.: 11/453,252

(22) Filed: Jun. 15, 2006

(65) Prior Publication Data

US 2008/0027848 A1 Jan. 31, 2008

(51) Int. Cl.
*G06Q 40/00* (2012.01)
(52) U.S. Cl.
USPC ............................................. 705/37; 705/35
(58) Field of Classification Search
CPC .............................. G06Q 40/00; G06Q 40/04
USPC ..................................................... 705/35–40
See application file for complete search history.

(56) References Cited

U.S. PATENT DOCUMENTS

| | | | | |
|---|---|---|---|---|
| 6,055,519 A * | 4/2000 | Kennedy et al. | ................ | 705/80 |
| 7,082,410 B1 * | 7/2006 | Anaya et al. | ..................... | 705/37 |
| 7,383,220 B1 * | 6/2008 | Keith | ............................. | 705/37 |
| 7,475,046 B1 * | 1/2009 | Foley et al. | ..................... | 705/74 |
| 7,882,007 B2 * | 2/2011 | Keith | ............................. | 705/37 |
| 2001/0049651 A1 * | 12/2001 | Selleck | .......................... | 705/37 |
| 2002/0052827 A1 * | 5/2002 | Waelbroeck et al. | ........... | 705/37 |
| 2002/0055901 A1 * | 5/2002 | Gianakouros et al. | ......... | 705/37 |
| 2002/0091617 A1 * | 7/2002 | Keith | ............................. | 705/37 |
| 2002/0120555 A1 * | 8/2002 | Lerner | ............................ | 705/37 |
| 2002/0156719 A1 * | 10/2002 | Finebaum et al. | .............. | 705/37 |
| 2002/0178103 A1 * | 11/2002 | Dan et al. | ........................ | 705/37 |
| 2003/0033239 A1 | 2/2003 | Gilbert et al. | | |
| 2003/0061069 A1 * | 3/2003 | Silverman et al. | ................ | 705/1 |
| 2003/0065608 A1 * | 4/2003 | Cutler | ............................ | 705/37 |
| 2003/0088501 A1 | 5/2003 | Gilbert et al. | | |
| 2003/0149653 A1 * | 8/2003 | Penney et al. | .................... | 705/37 |
| 2004/0088242 A1 * | 5/2004 | Ascher et al. | ................... | 705/37 |
| 2005/0055305 A1 * | 3/2005 | Lutnick et al. | .................. | 705/37 |
| 2005/0091142 A1 * | 4/2005 | Renton et al. | ................... | 705/37 |
| 2005/0289042 A1 * | 12/2005 | Friesen | .......................... | 705/37 |
| 2006/0059080 A1 * | 3/2006 | Benko et al. | .................... | 705/37 |

OTHER PUBLICATIONS

Salvati: "An Analysis of Market Microstructure: Electronic Trading Versus Open Outcry Trading in the U.S. Treasury 10-Year Interest Rates Futures Market", Touro University International in Partial Fulfillment of the Requirements for the Degree of Doctor of Philosophy in Business Administration Sep. 2006.*

\* cited by examiner

*Primary Examiner* — Eric T Wong
*Assistant Examiner* — Ed Baird
(74) *Attorney, Agent, or Firm* — Nixon & Vanderhye P.C.

(57) ABSTRACT

A method of negotiating trades on an electronic trading system is presented. In order to enable an intra-trading-system part-to part negotiation the method comprises the steps of receiving a trade negotiation request with respect to a selected order from a user; forwarding the trade negotiation request to a submitter of the selected order; receiving an accept or a reject to the trade negotiation request from the submitter; and initiating an intra-trading-system part-to-part negotiation procedure between the user and the submitter if the negotiation request is accepted by the submitter. An electronic trading system is also disclosed.

16 Claims, 7 Drawing Sheets

| Price | Buy | Sell |
|-------|-----|------|
| 99,5  |     |      |
| 99,6  | B [50] |   |
| 99,7  | A [100] |  |
| 99,8  |     |      |
| 99,9  |     | C [100] |
| 100,0 |     | D [200] |
| 100,1 |     |      |
| 100,2 |     |      |

FIG. 4

| Price | Buy | Sell |
|-------|-----|------|
| 99,5  |     |      |
| 99,6  | B [50] |   |
| 99,7  | A [100] |  |
| 99,8  | E [100] |  |
| 99,9  | F [50] | C [100] |
| 100,0 |     | D [200] |
| 100,1 |     |      |
| 100,2 |     |      |

FIG. 5

| Price | Buy | Sell |
|-------|-----|------|
| 99,5  |     |      |
| 99,6  | B [50] |   |
| 99,7  | A [100] |  |
| 99,8  | E [100] |  |
| 99,9  | F [50] | C [100] ← Trade for 50 |
| 100,0 |     | D [200] |
| 100,1 |     |      |
| 100,2 |     |      |

FIG. 6

| Price | Buy | Sell |
|---|---|---|
| 99,5 | | |
| 99,6 | B [50] | |
| 99,7 | A [100] | |
| 99,8 | E [100] | |
| 99,9 | F [50] | ~~C [100]~~ |
| 100,0 | G [100] | D [200] | ← Trade for 100
| 100,1 | | |
| 100,2 | | |

FIG. 7

| Price | Buy | Sell |
|---|---|---|
| 99,5 | | |
| 99,6 | | |
| 99,7 | B [50] | |
| 99,8 | A [200] | |
| 99,9 | | C [100] |
| 100,0 | | D [200] |
| 100,1 | | |
| 100,2 | | |

FIG. 8

| Price | Buy | Sell |
|---|---|---|
| 99,5 | | |
| 99,6 | C [100] | |
| 99,7 | B [50] A [200] | |
| 99,8 | | |
| 99,9 | | D [100] E [200] |
| 100,0 | | F [50] |
| 100,1 | | |
| 100,2 | | |

FIG. 9

| Price | Buy | Sell |
|---|---|---|
| 99,5 | | |
| 99,6 | C[100] | |
| 99,7 | B[50] A[200] | H[100] |
| 99,8 | | G[50] |
| 99,9 | | D[100] E[200] |
| 100,0 | | F[50] |
| 100,1 | | |
| 100,2 | | |

B and H trade for 50

FIG. 10

| Price | Buy | Sell |
|---|---|---|
| 99,5 | | |
| 99,6 | C[100] | |
| 99,7 | A[200] | H[50] |
| 99,8 | | G[50] |
| 99,9 | | D[100] E[200] |
| 100,0 | | F[50] |
| 100,1 | | |
| 100,2 | | |

A and H trade for 50

FIG. 11

| Price | Buy | Sell |
|---|---|---|
| 99,5 | | |
| 99,6 | C[100] | |
| 99,7 | B[50] A[200] | |
| 99,8 | | |
| 99,9 | | D[100] E[200] |
| 100,0 | | F[50] |
| 100,1 | | |
| 100,2 | | |

FIG. 12

| Price | Buy | Sell |
|---|---|---|
| 99,5 | | |
| 99,6 | C[100] | |
| 99,7 | B[50] A[200] | |
| 99,8 | | |
| 99,9 | | D[100] E[200] |
| 100,0 | | F[50] |
| 100,1 | | |
| 100,2 | | |

FIG. 13

| Price | Buy | Sell |
|---|---|---|
| 99,5 | | |
| 99,6 | C[100] | |
| 99,7 | B[50] A[150] | |
| 99,8 | | |
| 99,9 | | D[300] E[200] |
| 100,0 | | F[50] |
| 100,1 | | |
| 100,2 | | |

FIG. 14

| Price | Buy | Sell |
|-------|--------|--------|
| 99,5  |        |        |
| 99,6  | B [50] |        |
| 99,7  | A [100] ← |     |
| 99,8  |        |        |
| 99,9  |        | C [100] |
| 100,0 |        | D [200] |
| 100,1 |        |        |
| 100,2 |        |        |

Negotiation request for A from E

FIG. 15

METHOD OF NEGOTIATING TRADES ON AN ELECTRONIC TRADING SYSTEM AND AN ELECTRONIC TRADING SYSTEM

TECHNICAL FIELD

The present invention relates to a method for negotiating trades on electronic trading systems.

The present invention also relates to an electronic trading system enabling on-line trading negotiation between users.

BACKGROUND

Electronic trading systems have become more and more popular over the years and have replaced earlier, manual, forms of trading. Especially in the financial market, electronic trading systems are important to provide a fair and properly working market place for trading.

The trading can be based on different principles for reaching a deal. For instance, in the bond market it is customary that users enter bids and offers which can be hit or taken by other users; whereas in the futures market the users enter bids and offers, and the trading system compares these and matches them into deals.

Although the trading principles per se can be viewed as a form of negotiation, there is a need for more precise and versatile systems and methods for negotiation of prices (or other aspects in the terms of a deal) within electronic trade systems.

US patent application publication No. 2003/0088501 discloses a system where an inner market is set up at selectable intervals for providing a negotiation platform for a selected amount of users. The selection of users is by picking those users that currently have the best bids and offers on the market. Within the inner market only bids and offers that improve on the general market will be accepted and only those participating in the inner market may trade.

Another principle of limited negotiation is disclosed in US patent application publication No. 2003/0033239. Here a user of the system may enter a Request For Quote (RFQ), i.e. asking for a price on a specific instrument. The system posts the RFQ to a selected group of users, who may respond to the RFQ by sending in a quote on price (buy or sell depending on character of the RFQ). If a quote is sent in to the system, it is forwarded to the user who entered the RFQ. The user may then accept, reject or counter-quote the quote. If an agreement is reached, a trade is made. The system also includes a time limit for the negotiation.

Both the above systems are similar in that the negotiation only involves a limited group of users and that there is no information to other users of what is going on.

There is a need for a more versatile and precise method for negotiating trades between users of an electronic trading system that does not impair fairness and openness vis-à-vis other users on the market.

There is also a need for an electronic trading system that provides for a versatile and precise negotiation procedure for users without impeding on fairness and openness to other users on the market.

BRIEF SUMMARY

A method of negotiating trades on an electric trading system is provided that clearly fulfils the need.

The method includes the steps of receiving a trade negotiation request with respect to a selected order, forwarding the negotiation request to the submitter of the selected order, and initiating a negotiation procedure if the negotiation request is accepted.

The negotiation procedure may advantageously include the step of setting the selected order in a frozen state where it may not be automatically matched with any other order by the electronic trading system while negotiation takes place. Hereby, the order can not be traded but retains its position (priority) in the order book. If a full agreement is reached during the negotiation, the order is matched and removed from the order book. If a partial agreement is reached regarding the frozen order, the agreed part is matched and the remainder is left (un-frozen) in the order book. If no agreement is reached the selected order is set in an unfrozen state (reset to normal state) where it may again be automatically matched with any other order by the electronic trading system.

The above effect could also be achieved by hiding the order instead of displaying it as frozen, but the market maintains a higher level of openness if the order that is object for negotiation is still visible, although not tradable.

If there is an agreement reached it would be advantageous if the method automatically matches the order at the agreed level.

Hereby any user may select an order existing in the electronic trading system that they want to negotiate about. It need not even be the best bid/offer present as the user may have other reasons for entering a negotiation (possibility of filling the trade with only one counter-part, finding specific counterparties more reliable than others, etc.). Multiple parts may participate on both sides of the negotiation, as long as one or more users invite the other parties to the negotiation.

Since all users can see that an order is frozen, there is a knowledge that a negotiation is proceeding with that order. The benefit of a frozen order is that if negotiations fail, the submitter of that order retains his status in the order book.

To further increase this openness in the system, it may be required that a user who wishes to enter a negotiation must also have an order published on the system. This order is also put in a frozen state upon entering negotiation proceedings. The other users may then see which two (or more) orders that are undergoing negotiation.

It is beneficial if there is a time limit for the negotiation procedure, so that any order is kept at a frozen state for a minimum of time.

In case the market does not allow a crossing market (buy prices exceeding sell prices), any frozen order that crosses the market may be immediately deleted from the order book (thus ending the negotiation without a trade).

In the alternative, the frozen order may only be deleted once the negotiation procedure is finished (without agreement), i.e. when it is unfrozen. This gives the submitter of the order a chance to reach a trade even though the market has moved.

Yet another alternative is to automatically send a warning to the submitter of a frozen order when a crossing of the market takes place, giving the submitter a chance of immediately cancelling the negotiation procedure and have the order unfrozen (most likely being immediately matched).

The users of the electronic trading system will also be informed of any agreed trade in a successful negotiation procedure.

An electronic trading system that provides the above-described needs is achieved with a system comprising a matching unit for matching orders submitted by users, an order book associated with the matching unit for storing unmatched orders and a negotiation unit associated with the order book for enabling negotiation between users over orders present in the order book.

In the electronic trade system, the negotiation unit comprises a reception section for receiving negotiation requests from users with respect to an order in the order book. The reception section may check that there is a valid order corresponding to the trade negotiation request and, if necessary, check any other prevailing prerequisites that may exist (e.g. that the parties have previously acknowledged that they are prepared to enter this kind of negotiations). Once all checks are cleared, an invitation to reply to the request may be distributed via a transmission section to the submitter of the order. A control section may send orders to the order book for setting the selected order in a frozen state (possibly as soon as the request for negotiation is received) and for de-freezing the selected order upon failure to reach an agreement (or if the submitter of the selected order turns down the negotiation request).

A computer program product comprising software code on a carrier which, when loaded onto a computer system carries out method steps achieving the aims is also considered. The software code could control the computer system to perform the steps of; identifying a trade negotiation request from a user with respect to a selected order; identifying a target user of the trade negotiation request; forwarding the trade negotiation request to the target user; identifying a response to the trade negotiation request from the target user; determining whether the target user accepts or rejects the negotiation request; and initialising a negotiation procedure between the user and the target user if the target user accepts a negotiation.

The software of the computer program product, when loaded onto a computer system, may carry out the further method steps of setting the selected order in a frozen state and preventing the frozen order from being matched with other orders during the negotiation procedure. If no agreement can be reached during the negotiation, the order will be de-frozen and available for normal trading again. The order may at this point retain its priority position in the order book.

BRIEF DESCRIPTION OF THE DRAWINGS

FIGS. 4-15 show examples of order book appearances in an operating environment.

DETAILED DESCRIPTION

Figure 1:
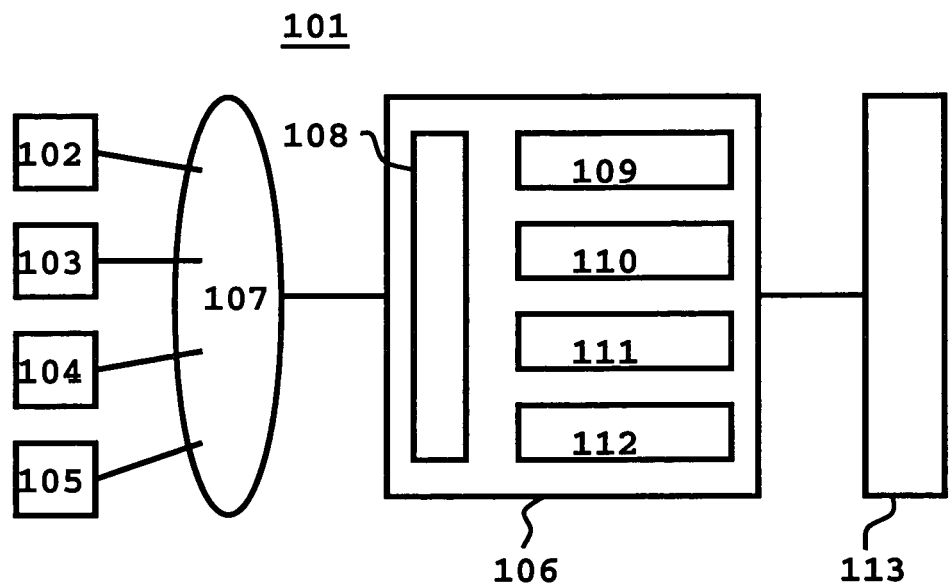
FIG. 1 is a schematic drawing of an embodiment of an electronic trading system.

FIG. 1 depicts a market place 101. The market place 101 comprises a number of users (traders, participants), here represented by a first user 102, a second user 103, a third user 104 and a fourth user 105. The users 102, 103, 104, 105 could be manually used terminals, trading houses (including a number of manually used terminals), or partially/fully automatic trading computers (trading in accordance with their programming). The users 102, 103, 104, 105 can communicate with an electronic trading system 106 through a network 107.

The term "terminal" indicates any device through which a person may enter commands and receive information (PC, laptop, palm-held devices, mobile phones, etc). Likewise, "trading computers" include any programmable device. Also, "network" depicts any means of creating a signal flow, i.e. communication wires, fibres, wireless communication, Internet, Ethernet, LAN, etc.

The electronic trading system 106 will in this example embodiment be described as a financial instrument trading system, where orders are entered by the users 102, 103, 104, 105 and the trading system automatically matches orders to create trades. However, technology can be used on other trading systems as well, as will be indicated further below.

The electronic trading system 106 is now described with reference to functional blocks rather then physical components since it can be made up of essentially any combination of hardware and software for performing the functions.

Thus, the electronic trading system 106 comprises a communication unit 108, a matching unit 109, an order book 110, an information dissemination unit 111, and a negotiation unit 112.

The communication unit 108 handles all incoming and outgoing signals. In its simplest form it may be a network port (or a set of network ports).

The matching unit 109 has as primary function to compare incoming and existing orders for each instrument being traded on the electronic trading system to see if matching orders can be found for trades. Whenever a match is found, the orders are transferred to a deal capture system 113, which carries out all necessary steps for completing the trade.

The order book 110 is basically a memory containing all unmatched orders, sorted by instruments.

The information dissemination unit 111 handles all outgoing information to the users 102, 103, 104, 105. Most important is here information about the market, i.e. the status of the order book 110 and information about any trade that has been made. The information dissemination unit 111 is thus closely co-operating with the matching unit 109 and order book 110 to extract (and possibly convert) the necessary information.

The negotiation unit 112 provides a new feature for an electronic trading system, namely the possibility for users to engage in intra-trading-system, part-to-part negotiations over selected orders. For instance, the third user 104 may be interested in a one-to-one negotiation with the second user 103 over an order that the second user 103 has in the order book.

The electronic trading system 106 can provide such negotiation in a new and versatile manner. The third user 104 can initialise the procedure by sending in a request to negotiation that indicates the order that has been selected by the third user 104 as the target for the negotiation. If required, the third user 104 also identifies one of its own orders as an "opposite" starting point for the negotiation.

The request for negotiation is received by the negotiation unit 112. The negotiation unit 112 forwards the request to the second user 103 and awaits the response. A maximum response time for accepting the request may also be set. If the second user 103 accepts to negotiate with the third user 104, the negotiation unit 112 will establish a direct communication link between the second user 103 and the third user 104 (or set up a system internal negotiation interface visible only to the second user 103 and third user 104). During negotiation the second user's 104 order (and the third user's 104 order if any) is placed in a frozen state, meaning that it cannot be traded or matched with other orders but retains its position (priority) within the order book.

Figure 2:
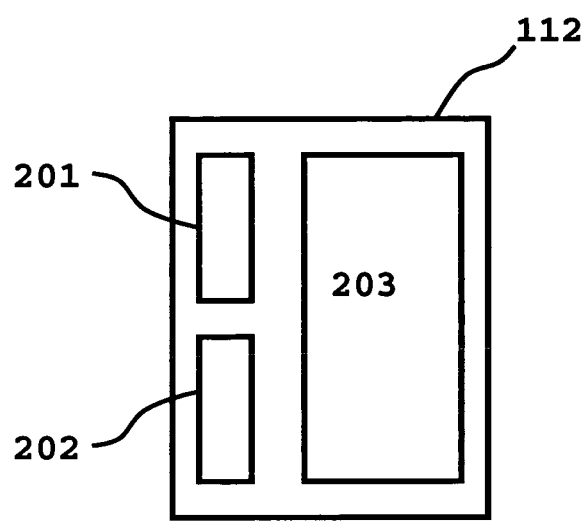
FIG. 2 is a schematic drawing of an embodiment of a negotiation unit in the electronic trading system.

From a functional perspective, the negotiation unit 112 can be viewed as comprising, see FIG. 2, a reception section 201 for receiving requests for negotiating from a user 102, 103, 104, 105, as well as receiving bids/offers during an negotiation, a transmission section 202 for sending out communications to the parties during negotiation, and a control unit 203 for setting up and performing a negotiation protocol to be followed during negotiation. The control unit acts as a mediator for the negotiation.

Figure 3:
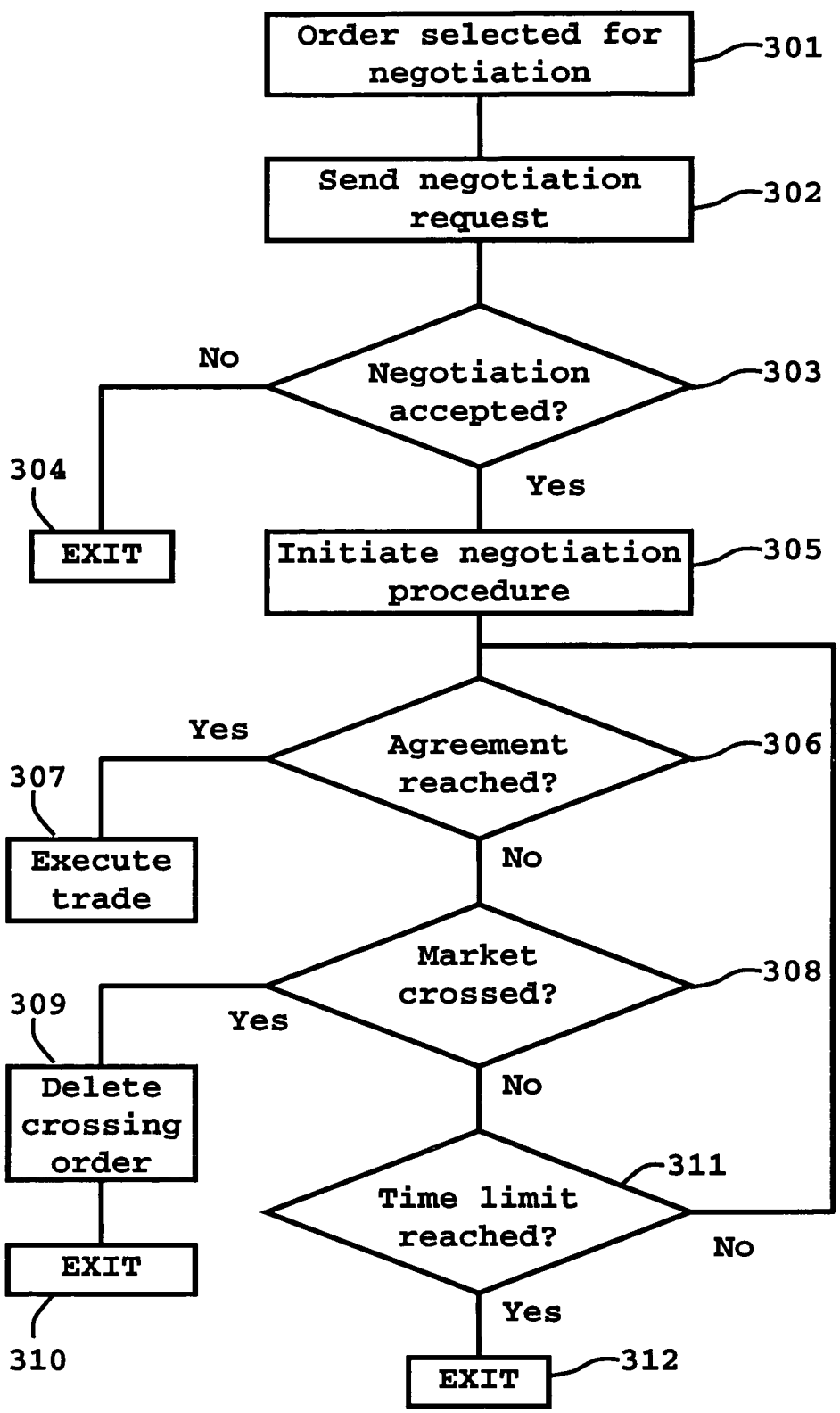
FIG. 3 shows a flow diagram describing an example embodiment of the method of negotiating.

One way of setting up a negotiation will now be described in connection with the flow chart shown in FIG. 3.

The process essentially starts, step 301, with a user selecting an order to negotiate about. It may be an order that displays a price coming close to what the user is willing to buy/sell at, it may be an order depicting a volume that the user wishes to buy/sell, it may an order submitted by a counterpart that the user is confident with and prefers trading with, or any other possible reason.

After selecting an order, a request for negotiation is sent into the trading system at step 302. The request will be identified by the negotiation unit, who transfers the request to the submitter of the selected order and awaits a response. Although not shown in the flow chart, there may be a time-out related to the negotiation request.

The submitter will respond by accepting or rejecting the negotiation, which is handled in step 303. If the negotiation request is rejected, there will be no negotiation and the flow ends in exit step 304.

If the negotiation request is accepted, a negotiation procedure will initiate in step 305. This procedure provides the user and the submitter to barter about the price and/or volume of the selected order. To avoid any risks that the selected order could be matched by the matching unit with another incoming order, the selected order will be set in a frozen state. The frozen state will prevent any matching, but maintains the position of the order in the order book, as well as displaying the order (as frozen) to all other users.

It may here be noted that the negotiation procedure may be formed so that it is required that a user who wishes to negotiate must first enter an order. In other words, negotiation will then take place as a means of finding an acceptable meeting point between two orders in the order book. Should this approach be used, both orders must be set in a frozen state. Again, information regarding which orders that are being negotiated should be sent out to all users. It may be preferable to identify each pair of orders should there be more than one negotiation going on at the same time (colour marking or any other identification).

Should an agreement be made a trade will be executed as indicated in step 307. The selected order (or both orders if so required) is then de-frozen, matched in accordance with the agreed level (price, volume or whatever was negotiated) by the matching unit and forwarded to the deal capture unit for clearing. For information purposes, any trade agreed upon through the negotiation scheme here described could be tagged or marked accordingly so that it may afterwards be possible to differentiate between "normal" trades and "negotiated" trades made on the trading system.

As long as there is no agreement reached, certain controls may be carried out to determine if negotiation can continue.

In this particular embodiment there is a check in step 308 to determine if there is a crossed market, i.e. if the price in the selected frozen order is "better" than existing orders (lower than the buy price if it relates to a sell order or higher than the sell price if it relates to a buy order). Certain markets do not allow crossed markets, so should this happen, then the crossing frozen order is deleted as indicated in step 309 and the negotiation is terminated (step 310).

In order to safe-guard the submitter, the system may send out information that a crossing is imminent, giving the submitter a chance to cancel negotiations to have the order de-frozen and matched in ordinary manner. This has not been indicated in the flow chart.

Another check that can be performed during negotiation is to ensure that the negotiation does not take too long. A time limit can be set (by the system or by the user/submitter), within which time limit, an agreement must be reached or negotiation cancelled. This is shown in steps 311 and 312. As long as the time limit is not reached or the market crossed, negotiation will continue.

FIGS. 4 through 10 show examples indicating order book, indicating how the method may be carried out with respect to initiating a negotiation by a user and how different steps during the negotiation may affect the presentation of the order book.

A first example starts in FIG. 4. Here a very basic order book display is depicted. The first column shows prices (in this case ranging from 99.5 to 100.2). Four orders have been indicated, two orders for buying (bids) and two orders for selling (offers). The first bid is from user A, who wants to buy 100 (of the instrument—e.g. stocks, bonds, options, etc.) at the price 99.7, and the second bid is from user B, who wants to buy 50 at the price of 99.6. The first offer is from user C, who wants to sell 100 at the price of 99.9, and the second offer is from user D, who wants to sell 200 at the price of 100.0.

It may here be noted that in an anonymous trading system, the user behind any given order is not known to the other users and is not broadcasted in any way. This example could be viewed as indicating the information contained within the order book and not the information displayed to the users. However, the principles described are possible to implement on any kind of trading system.

The difference between best bid and best offer is 0.2, which is also called the spread. In this instance, user A wishes to negotiate the price with user C which is indicated with an arrow. User A thus enters a request for negotiation with user C to the electronic trading system.

User C (submitter of the selected order) accepts the request to negotiate and a negotiation procedure is initiated. The orders from user A and user C are therefore frozen, which is indicated in FIG. 5 by greying out the fields containing the orders from user A and user B. These orders can not be traded through automatic matching by the electronic trading system. This is illustrated in FIG. 5 through the further bids that have been entered, namely a third bid from user E, who wants to buy 100 at the price of 99.8 and a fourth bid from user F, who wants to buy 50 at a price of 99.9, i.e. the same price that user C wants to sell at. Since user C's order is frozen, no matching takes place.

If user A and user C agrees on a common price, e.g. 99.8, a trade will take place at this price and both orders be removed for clearance.

Should the negotiation fail, i.e. result in a non-agreement, both orders (user A's and user C's) are un-frozen, thus becoming tradable and user F and user C will automatically be matched for 50 at the price of 99.9 as shown in FIG. 6 (after which user F's order disappears and user C's order is diminished by 50.

As mentioned above, there are certain trading systems that do not allow crossing markets. In FIG. 7 such a situation has occurred during the negotiation described in connection with FIGS. 4 and 5. Here a fifth bid has been entered by user G, who wants to buy 100 at the price of 100.0. First of all the frozen order from user C will be deleted (indicated by double crossing lines). Secondly there will be a trade (automatic matching) between user G and user D. It is then a matter of choice whether the system should allow the negotiation to proceed or not. In the latter case (negotiation not allowed to continue) user A's frozen order will of course be un-frozen.

Similarly, user A's frozen order will be un-frozen if continued negotiation is allowed, but does not result in a deal.

The above examples have shown situations where a shear price negotiation was of interest, thus involving the parties being closest in price. There may however other exist other options which determine which order to select to negotiate, for instance to select an order that matches one's own in size, as indicated in the example of FIG. 8. Here user A elects to request negotiation with user D, who has a lower priority and is further away in price. The reason for electing D may be (in a non-anonymous system) that user A finds user D more reliable.

Another example is shown in FIG. 9

Here there is a first bid from user A to buy 200 at the price of 99.7. A second bid exists from user B, who wants to buy 50 at the same price of 99.7 (user A having priority over user B for being the first to enter the bid). A third bid exists from user C, who wants to buy 100 at the price of 99.6. A first offer has been entered by user D, who wants to sell 100 at the price of 99.9. A second order has been entered by user E, who wants to sell 200 at the same price 99.6 (user D having priority over user E for automatic matching). A third offer has been entered by user F, who wants to sell 50 at the price of 100.0.

User A believes it to be fruitful to enter negotiation, but is rather interested in filling the entire order in one trade and user D can only fill half of that. Of course, one possibility would be for user A to enter a volume negotiation with user D, but in this case user A selects to request negotiation over price with user E, who can fill the entire order in one trade. User A therefore mark user E's order for requesting a negotiation.

User E agrees to this and a negotiation procedure is initiated. User A's and user E's order are therefore frozen (FIG. 10).

During the negotiation further orders are entered. A fourth offer from user G, who wants to sell 50 at the price of 99.8 and a fifth from user H, who wants to sell 100 at the price of 99.7. Since user A's order is frozen there can be no match with user H's offer. Instead a match is made between user B and user H for 50 at the price of 99.7. User B bypasses therefore user A's priority (FIG. 10).

Should user A and user E reach an agreement, there will be a trade at the agreed level (e.g. 99.8) for the entire volume of 200, and those orders would be de-frozen and removed for clearance.

If, however, no agreement can be reached during the negotiation procedure, both orders are un-frozen and retain there positions in the order book (FIG. 11). Since user H has an outstanding offer of 50 remaining at the price of 99.7, there will be an automatic match between user A and user H for 50 at 99.7.

In the scenarios described in connection with FIGS. 4 through 11 negotiations have been made on a one-to-one basis. However, this is not necessary as the following example will show in connection with FIG. 12 and FIG. 13.

As shown in FIG. 12, user A has a bid to buy 200 at the price of 99.7, user B has a bid to buy 50 also at 99.7 and user C has a bid to buy 100 at 99.6. On the other side, there is user D who has an offer to sell 100 at 99.9, user E also offering to sell 100 at 99.9 and user F offering to sell 50 at 100.

User A wants to (try to) fill the entire purchase in one trade and is therefore interested in negotiating with both user D and user E in order to do so. This is indicated by the arrows from user A to both user D and user E.

It is sufficient if one of users D and E accept to negotiate to initiate the negotiation procedure. In this case, both user D and user E accepts to negotiate, whereby user A's bid, user D's offer and user E's offer are all set in the frozen state as indicated in FIG. 13.

In FIG. 14 another order book status is indicated. Here there is a bid to buy 150 at 99.7 from user A, a bid to buy 50 at 99.7 from user B, a bid to buy 100 at 99.6 from user C, an offer to sell 300 at 99.9 from user D, an offer to sell 100 at 99.9 from user E and an offer to sell 50 at 100 from user F.

In this scenario, user B would like to initiate negotiations with user D, but finds the 50 to be a much too small trade. So, user B issues a negotiation invitation to user A, aiming at engaging user A as well in a negotiation request to user D.

If user A finds such negotiation acceptable there will be a joint request for negotiation sent to user D. If the negotiation is accepted the negotiation procedure is initiated and the two bids and single offer frozen (not explicitly shown).

Should user A not be willing to participate in such negotiation, user B may still request the negotiation on a one-to-one basis with user D.

The above latest examples can be combined providing for engaging any number of parties on both sides for negotiation.

Yet another example of the possibilities to engage into negotiation in accordance with the invention is shown in FIG. 15.

This example demonstrates that there is no need for a user wanting to enter a request to negotiate to actually have an order of its own present in the system's order book.

FIG. 15 shows an order book situation where user A has a bid to buy 100 at 99.7, user B has a bid to buy 50 at 99.6, user C has an offer to sell 100 at 99.9 and user D has an offer to sell 200 at 100.

In this case, a user E has no entered orders in the order book, but still wishes to negotiate with user A (wanting to sell to user A). A negotiation request is therefore entered directed to user A. Upon acceptance to negotiate, user A's bid will be frozen. The possible downside for user E is that if the negotiation fails and user E enters an order (offer) at the level that was intended for the negotiation, there will be no benefit from priorities that other users have (even if entered after the request for negotiation was made).

The invention claimed is:

1. A method of negotiating trades on an electronic trading system, comprising the steps of:
   storing by the electronic trading system in an order book memory bids and offers for an instrument entered by users at respective user terminals;
   receiving by the electronic trading system a trade negotiation request with respect to a selected order selected by one of the users and having a priority position in the order book;
   forwarding by the electronic trading system, prior to the selected order being matched, the trade negotiation request to a submitter of the selected order, wherein a match occurs when a bid order price for the instrument equals or exceeds an offer order price for the instrument;
   receiving by the electronic trading system an accept or a reject to the trade negotiation request from the submitter; and
   initiating by the electronic trading system an intra-trading-system negotiation procedure between the user and the submitter for the selected order when the negotiation request is accepted by the submitter, where the intra-trading-system is within the electronic trading system and the intra-trading-system negotiation procedure uses a control unit in the electronic trading system to control the negotiation procedure;

setting the selected order in the order book to a frozen state at the priority position in the order book, wherein the frozen order cannot be matched by the electronic trading system while the negotiation procedure is active; and setting the selected order at the priority position in the order book to a non-frozen state when the negotiation results in a non-agreement to trade between the user and the submitter and allowing the electronic trading system to match the selected order at the priority position in the order book with other orders.

2. The method according to claim 1, including the step of matching the selected order when the negotiation results in an agreement to trade between the user and the submitter, the matching being made in accordance with the agreement.

3. The method according to claim 2, including the step of informing all users of all relevant details of the agreement between the user and the submitter when the agreement is reached.

4. The method according to claim 1, including the step of only allowing the user to enter a request for negotiation after the user has entered an order in the order book that is used as a negotiation object in the negotiation procedure.

5. The method according to claim 1, including the step of deleting a frozen order in the order book when the market moves so that the frozen order creates a crossed market.

6. The method according to claim 5, including the step of informing the submitter of the frozen order that the frozen order will be deleted in the order book within a stated time period due to the occurrence of a crossed market.

7. The method according to claim 1, including the steps of:
setting a time limit for the negotiation procedure;
cancelling the negotiation procedure when no agreement is reached between the user and the submitter within the set time limit.

8. The method according to claim 1, including the steps of:
receiving a further trade negotiation request with respect to at least one further selected order selected by a user from the order book;
forwarding the further trade negotiation request with respect to the at least one further selected order to each submitter of the at least one further selected order;
receiving an accept or a reject from each submitter of the at least one further selected order; and
initiating another intra-trading-system negotiation procedure between the user and each submitter accepting the further trade negotiation request.

9. The method according to claim 1, including the steps of:
receiving an invitation to a selected further user to participate in the trade negotiation request with respect to the selected order;
forwarding the invitation to participate in the trade negotiation request with respect to the selected order to the selected further user;
receiving an accept or a reject to the invitation to participate in the trade negotiation request with respect to the selected order from the selected further user;
forwarding the trade negotiation request to a submitter of the selected order indicating both the user and the further user as counter-parts when the further user accepted the invitation to participate in the trade negotiation request with respect to the selected order.

10. The method in claim 1, wherein the trade negotiation request is received prior to receiving a matching trade order for the selected order from the user and wherein an accept or a reject to the trade negotiation request from the submitter is received prior to matching the selected order.

11. An electronic trading system comprising:
a matching unit configured to match orders submitted by users, where a match occurs when a bid order price for an instrument equals or exceeds an offer order price for the instrument,
an order book memory connected to the matching unit configured to store unmatched orders for the instrument, and
a negotiation unit connected to the order book and configured for intra-trading-system negotiation between users of the electronic trading system of orders present in the order book, where the intra-trading-system is within the electronic trading system and the intra-trading-system negotiation uses the negotiation unit to control the negotiation,
wherein the negotiation unit comprises:
a reception section configured to receive a negotiation request from one of the users with respect to a selected order in the order book entered by a submitter, where the selected order has a priority position in the order book,
a transmission section configured to forward, prior to the selected order being matched, the negotiation request to a submitter of the selected order, and
a control section, connected to the reception section and the transmission section, upon acceptance to negotiate by the submitter, configured to issue a command to the order book that the selected order is to be set to a frozen state at the priority position in the order book making it unavailable for matching by the matching unit and to establish a negotiation connection between the user and the submitter via the reception section and transmission section,
wherein the control section is further configured to set the selected order to a non-frozen state at the priority position in the order book when the negotiation results in a non-agreement to trade between the user and the submitter to allow the electronic trading system to match the selected order with other orders.

12. The electronic trading system according to claim 11, wherein the negotiation unit is arranged to issue a command to the matching unit to match a negotiated order that results in agreement in accordance with agreed parameters during the negotiation.

13. The electronic trading system according to claim 11, further comprising an information dissemination unit connected to the negotiation unit for broadcasting negotiation information to the users.

14. The electronic trading system in claim 11, wherein the trade negotiation request is received prior to receiving a matching trade order for the selected order from the user and wherein an accept or a reject to the trade negotiation request from the submitter is received prior to matching the selected order.

15. A non-transitory, computer readable storage medium comprising executable software code which, when executed by a computer system in an electronic trading system, causes the electronic trading system to perform the steps of:
storing in an order book memory bids and offers for an instrument entered by users at respective user terminals;
receiving a trade negotiation request with respect to a selected order selected by one of the users and having a priority position in the order book;
forwarding, prior to the selected order being matched, the trade negotiation request to a submitter of the selected order, wherein match occurs when a bid order price for the instrument equals or exceeds an of order price for die instrument;

receiving an accept or a reject to the trade negotiation request from the submitter; and initiating an intra-trading-system negotiation procedure between the user and the submitter for the selected order when the negotiation request is accepted by the submitter, where the intra-trading-system is within the electronic trading system and the intra-trading-system negotiation procedure uses a control unit in the electronic trading system to control the negotiation procedure;

setting the selected order in the order book to a frozen state at the priority position in the order book, wherein the frozen order cannot be matched by the electronic trading system while the negotiation procedure is active; and setting the selected order at the priority position in the order book to a non-frozen state when the negotiation results in a non-agreement to trade between the user and the submitter and allowing the electronic trading system to match the selected order at the priority position in the order book with other orders.

16. The non-transitory, computer readable storage medium in claim 15, wherein the trade negotiation request is received prior to receiving a matching trade order for the selected order from the user and wherein an accept or a reject to the trade negotiation request from the submitter is received prior to matching the selected order.

\* \* \* \* \*